United States Patent [19]
Mitchell et al.

[11] Patent Number: 5,323,362
[45] Date of Patent: Jun. 21, 1994

[54] SONAR SYSTEM EMPLOYING SYNTHETIC ORTHOGONAL ARRAY

[75] Inventors: Bruce C. Mitchell, Ellicott City; Gretchen R. Greene, Severn, both of Md.

[73] Assignee: Westinghouse Electric Corporation, Pittsburgh, Pa.

[21] Appl. No.: 72,806

[22] Filed: Jun. 7, 1993

[51] Int. Cl.⁵ ............................................. G01S 15/00
[52] U.S. Cl. ......................................... 367/104; 367/7
[58] Field of Search ......................... 367/7, 103, 104; 73/618; 128/660.09

[56] References Cited

U.S. PATENT DOCUMENTS 4,694,434  9/1987  von Ramm et al. ..................... 367/7

*Primary Examiner*—Daniel T. Pihulic

[57] ABSTRACT

A synthetic Mill's Cross scanner array is provided for a sonographic system. The array includes orthogonal lines for which projector and hydrophone are respectively provided. During a scan of a target volume, the projector and the hydrophone elements are moved from first paired positions to second paired positions, etc. to n paired positions. Data from the scan is processed to provide three-dimensional data for displaying the target volume.

5 Claims, 3 Drawing Sheets

SONAR SYSTEM EMPLOYING SYNTHETIC ORTHOGONAL ARRAY

BACKGROUND OF THE INVENTION

The present invention relates to sonar systems and more particularly to sonar systems employing two-dimensional scanner arrays to locate targets in three dimensions in a scanned volume.

A sonar which must scan a volume and locate targets in three dimensions requires at least a two dimensional array. Assuming that the two-dimensional array requires at least N elements in each dimension to achieve the desired acoustic beam shape, the total element count is as much as $N^2$. A conventional Mill's Cross transducer configuration is often used to reduce the array element count to 2N because it only requires two line arrays of N elements each. One Mill's Cross line array is commonly a projector line and the other Mill's Cross line array is a hydrophone line so that the fan beam patterns of each line multiply to provide high resolution in two dimensions.

The fully populated array and the Mill's Cross array both have serious deficiencies when required to be focused to produce very high resolution. The projector can only be focused at one range and angle per ping. Consequently, the sector scan time becomes prohibitive with an increase in resolution. The sector scan problem may be mitigated by adding a second hydrophone line array parallel to the projector line. The projector may be shortened to insonify wide subsectors with adequate depth of field. The parallel hydrophone supplies the resolution with fewer elements. However, this technique is subject to signal masking in reverberant environments and often cannot be used.

A Mill's Cross array can be implemented with two independent orthogonal synthetic arrays thereby resolving the depth of field problem by enabling data to be collected before processing. The element spot count is the same as a real array for the same resolution and beam shape so 2N complex multiplies are required per resolution cell. The signal to reverberation ratio (SRR) in each beam can be low because of the wide beamwidth in one dimension for each array. The SRR problem is the same problem encountered when using wide projector beam and collinear hydrophone array described above. When two such orthogonal beams are combined, the increased beam resolution does not result in SRR increase.

A synthetic Mill's Cross can be implemented by scanning a projector element along a line orthogonal to a real line array of hydrophone elements. Backscatter data from each projector transmission is collected by all hyrdophone elements and combined linearly to give high beam resolution. This method works well in reverberant environments but requires $N^2$ complex multiplies per resolution cell. It also requires a hydrophone array which may be impossible to implement at very high frequencies and resolutions. The problem is poor acoustic isolation and high noise levels of tiny closely packed hydrophone elements.

Accordingly, prior art, high frequency, high resolution, two dimensional arrays have been deficient in achieving sufficient SRR, fabricability, and data processing load.

SUMMARY OF THE INVENTION

The present invention is directed to a sonar system in which high resolution scanning is performed by a synthetic orthogonal line array with significantly reduced data quantity and multiplication computation, elimination of tiny, closely packed transducer elements, and high SRR.

An ultrasound sonographic system comprises a synthetic scanner array having substantially orthogonal lines each having successive position spots with predetermined spacing therebetween, with means for projecting acoustic signals into a target volume to be scanned and means for receiving reflected signals from within the target volume to be scanned. The projecting means and the receiving means are disposed at predetermined locations along the orthogonal scanner array lines.

Means are provided for stepping the projecting means and receiving means from spot to spot along the array lines in a predetermined pattern of positions to enable a target volume scan to be performed. Means are provided for energizing the projecting means to transmit an acoustic signal into the target volume from each spot to which the projecting means is stepped. Electric signals are generated by the receiving means in response to reflected acoustic signals received at each spot to which the receiving means is stepped and are processed to provide image data for the scanned target volume. Means are provided for controlling the rate at which the stepping and energizing means are operated so that sufficient return data is generated to enable a target scan to be executed in a predetermined time period. The image data is processed for display.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate a preferred embodiment of the invention and together with the description provide an explanation of the objects, advantages and principles of the invention. In the drawings.

DESCRIPTION OF THE INVENTION

Figure 1:
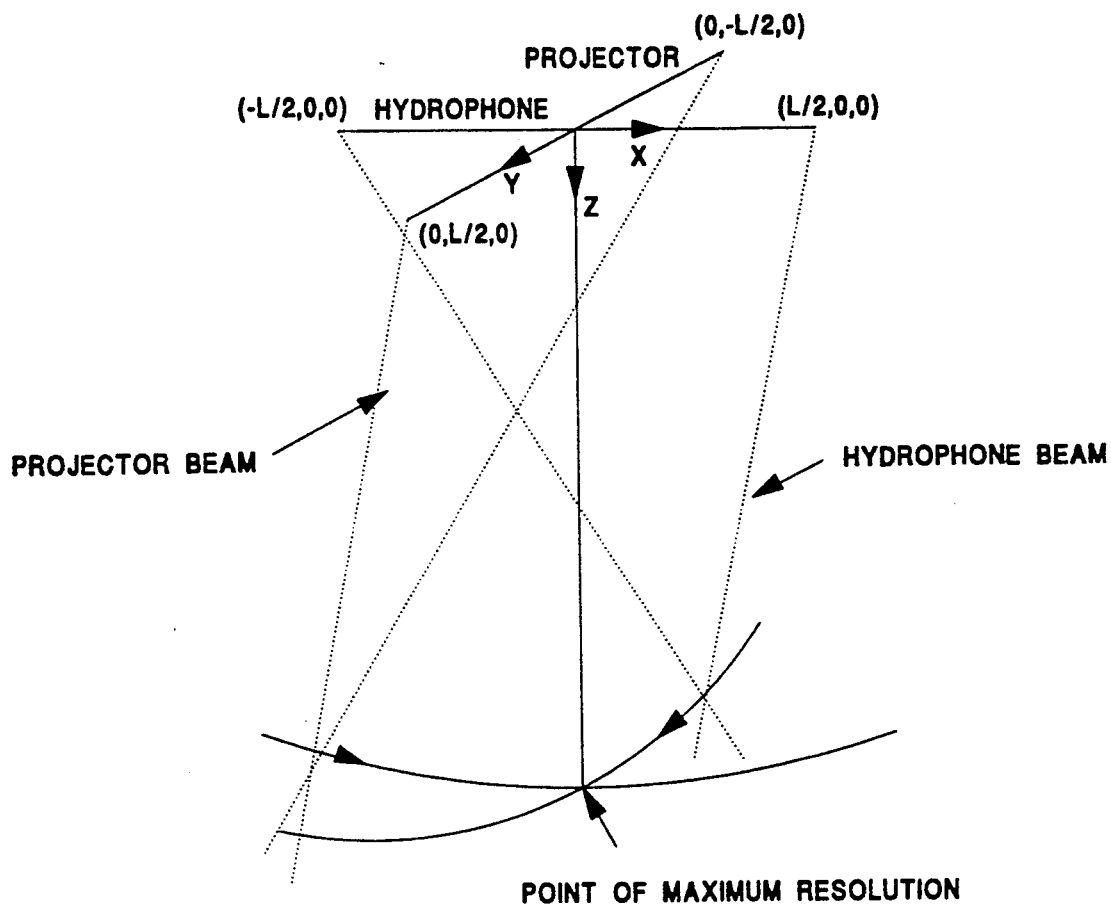
FIG. 1 is a schematic diagram of a Mill's Cross array of the prior art.

In FIG. 1, there is shown a prior art Mill's Cross scanner array 100 which is formed from two transducer line arrays. The Mill's Cross is an array concept that has been employed in sonar technology for many years.

A limited description of the prior art Mill's Cross array 100 is provided herein to facilitate an understanding of the invention.

The prior art scanner array 100 includes orthogonal projector and hydrophone axes 102 and 104. Tiny acoustic projector elements (not indicated) are positioned along the Y-axis 102. Tiny hydrophone receiving elements (not indicated) are positioned along the X-axis 104.

The projector elements transmit an acoustic beam that is focused on a circle around the Y-axis. The hydrophone elements receive an acoustic reflection beam focused from a circle around the X-axis. A point of maximum resolution in both the XZ and YZ planes is indicated by the reference character 106.

Acoustic scanning of a volume to locate targets in three dimensions requires a scanner array having at least two dimensions with N elements along each dimension. As compared to a "full" two-dimensional array, the prior art Mill's Cross array 100 reduces the required number of transducer elements to 2N from $N^2$. The physical size of the Mill's Cross array 100 and that of a filled two-dimensional array are the same. Further, the problem of fabricating the Mill's Cross array 100 and its electronics for high resolution sonographic system use is severe, if not impractical.

Figure 2:
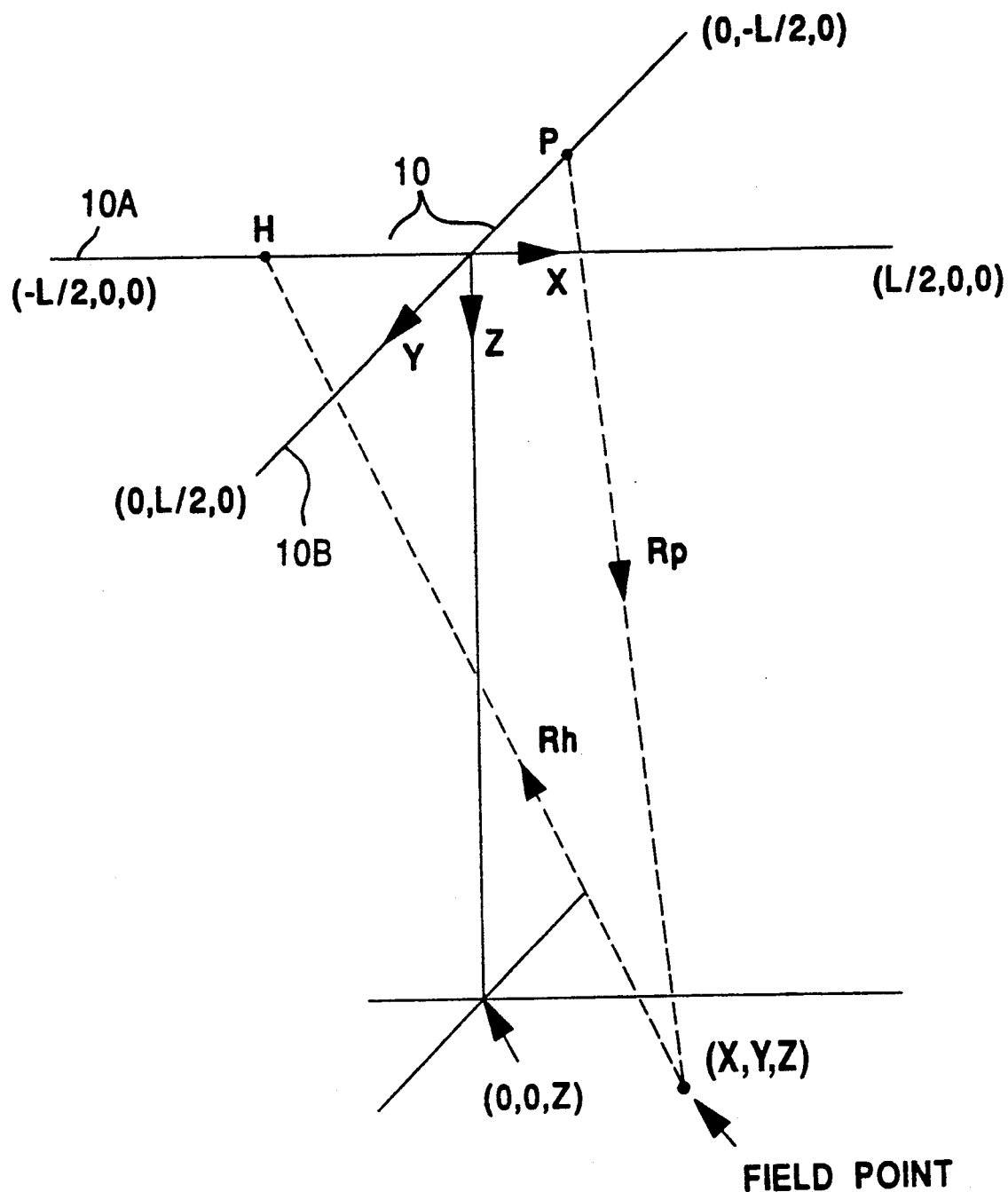
FIG. 2 schematically illustrates a synthetic paired element, orthogonal scanner array arranged in the form of a Mill's Cross in accordance with the present invention.

In FIG. 2, there is shown a synthetic, paired element orthogonal scanner arranged as a Mill's Cross scanner array 10 in accordance with the invention. The synthetic array 10 consists of two orthogonal array lines 10A and 10B. A single receiving transducer element or a hydrophone H and a single transmitting transducer element or a projector P are moved from spot to spot along their respective array lines 10A and 10B. There are N equally spaced element spots along each array line 10A or 10B.

At each projector spot, the projector P transmits an acoustic pulse or ping and the returns out to maximum range are collected by the hydrophone H. Thus, each projector element spot is paired with a hydrophone element spot.

The characteristics of the array beam pattern depend on the strategy used to pair the projector and hydrophone spot positions and how the hydrophone data is combined.

The simplest scanning strategy is to start the hydrophone and projector at the ends of their lines. The projector advances N equally spaced steps to the opposite end of its line. The hydrophone also advances simultaneously to the opposite end of its line in N equally spaced steps. At each step, the projector transmits and the backscatter energy is collected by the hydrophone and recorded.

After the scan is completed, a focus point is selected in the scanned field. The recorded data from each transmission, corresponding to the distance from the projector to the focus point and back to the hydrophone, is retrieved and added in complex form to form the response at the focus point. Assuming the projector and hydrophone in FIG. 2 are scanned in the positive directions, the array response about the focus point, (O,O,Z), is:

$$F(x,y) = \frac{L\sin\frac{\pi L(x+y)}{\lambda Z}}{\frac{\pi L(x+y)}{\lambda Z}} \quad \text{(EQUATION 1)}$$

where: focal plane passes through Z and is coplanar with the array xy plane
Z = distance from array to focal point
x,y = distance coordinates from focal point to field point
$\lambda$ = wavelength
L = lengths of hydrophone and projector lines The response about the focus point, when the projector is scanned in the negative direction while the hydrophone is scanned in the positive direction, is:

$$F(x,y) = \frac{L\sin\frac{\pi L(x-y)}{\lambda Z}}{\frac{\pi L(x-y)}{\lambda Z}} \quad \text{(EQUATION 2)}$$

EQUATION (1) describes a fan beam which has the resolution of a real array of length L along the x and y axes and twice this resolution along the x=y diagonal. It has no resolution along the x=y diagonal. EQUATION (2) describes a beam with the same resolution along the x and y axes, twice this resolution along the x=y diagonal, and no resolution along the x=-y diagonal.

The beam outputs described by EQUATIONS (1) and (2) can be added to obtain full resolution in all directions in the focal plane. When added, the resolution along the x and y axes is that of a real array of length, L. Resolution is doubled along the diagonals. Most sidelobe energy is collected in four thin sidelobes on the diagonals which are 6 dB lower than the beam response at the focal point. This beam pattern requires 2N complex multiplies per resolution cell and is useful in reverberation free environments, volume reverberant environments with limited scatterers, and near most reverberant surfaces.

The beam outputs described by EQUATIONS (1) and (2) may be multiplied to obtain slightly higher resolution along the x and y axes in the focal plane. The maximum sidelobe level is 13.3 dB below the main lobe response at the focal point, without shading. Resolution is slightly higher in all directions in the focal plane, compared with the resolution obtained when using addition:

The second general scanning strategy is to scan the projector in equal steps along its line as described above. The hydrophone spot locations associated with each projector element spot are located-pseudo randomly along the hydrophone line. The particular assignment of hydrophone element spots is determined empirically to achieve maximum resolution in all directions in the focal plane and minimum sidelobes with a single scan. N complex multiplies are required per resolution cell. This technique achieves sufficient SRR in strong volume reverberation environments.

Further increase in SRR can be achieved with the pseudo-random element pairing technique by making two or more scans using different pairing assignments for each scan. N complex multiples are required per scan.

Commercially available apparatus can be used to implement this invention to a degree which is a function of the application. A hand held unit with one inch resolution at ten feet may be implemented entirely with available hardware components. An ultrasound mammography sonar uses essentially the same hardware with transducer elements appropriately designed to maximize its field of view.

SONAR SYSTEM

Figure 3:
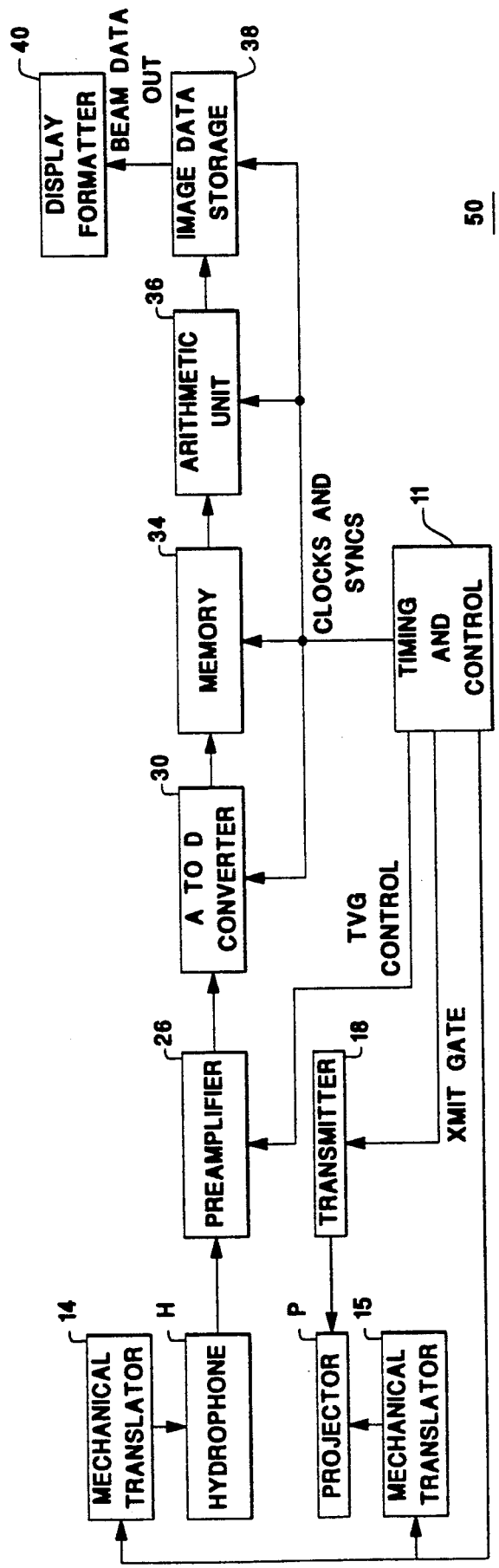
FIG. 3 shows a block diagram of a sonar system in which the synthetic paired element, scanner array of FIG. 2 is employed in accordance with the invention.

A sonographic system 50 shown in FIG. 3 includes the synthetic, paired-element Mill's Cross scanner array 10 and other system elements to produce three-dimensional target images from the scanner data in accordance with data collection and processing procedures of the invention.

Respective mechanical translators or motors 14 and 15 are provided for the transducer elements of the synthetic paired-element orthogonal or Mill's Cross scanner array 10, i.e., separate motors 14 and 15 are provided for transmitting transducer P and the hydrophone H. Motor drive electronics (not separately indicated) controls the energization of the motors 14 and 15 in response to command signals from a timing and control block 11.

The motors 14 and 15 drive the transducers H and P so that they step in unison from spot to spot along the respective array lines 10A and 10B. The projector, P, moves in one direction from end to end of its array. The hydrophone may move uniformly from end to end of its array in the same manner or it may move various distances between preassigned spots, each spot position unique to a projector spot position. In this case, the hydrophone moves in both directions during a scan. Each step is a predetermined distance, i.e. preferably about eight mils in the sonographic system 10. The preferred stepping distance is approximately equal to the wavelength of the acoustic transmitting frequency. If desired, larger or smaller steps may be employed.

A transmitter power amplifier 18 is connected to the projector P to generate acoustic signals (pings) at successive spot locations on the array projector line 10B. The timing and control block 11 applies command signals to a gate (not specifically indicated) which, in turn, triggers the transmitter power amplifier 18 to energize the projector P and generate the pings from each spot location along the projector line 10B.

The hydrophone H collects the acoustic signal backscatter from each P transmission. A preamplifier 26 amplifies and bandpass filters the return signals which are then converted to digital form by an analog to digital converter 30.

The digital signals are stored in a high speed buffer memory 34 until the scanning process is over.

The signals are converted to complex form prior to computations made to form focused beams. This can be done with analog circuitry in the preamplifier 26, by taking sequential samples 90 degrees apart in the converter 30, as preferred herein, or by subsequent digital filtering.

The hydrophone and projector elements H and P are mounted on a suitable mechanical device, such as that previously described, which translates them as required to form the element spot pairs. At each projector/hydrophone element position, the timing and control block 11 commands the transmitter amplifier 18 to drive the projector with a pulse of the required frequency and length.

The echoes are collected by the hydrophone H which generates an electrical output for amplification by the preamplifier 26. The preamplifier 26 also preferably provides time varied gain to reduce the signal dynamic range for further processing. An output signal from the preamplifier 26 is converted into an in phase and quadrature (I/Q) pair of signal samples to define both signal amplitude and phase at the sample point, converted to digital form, and placed in memory for later processing. Each of the N pings of data is tagged with the element locations where it was generated.

After the data is collected from each hydrophone element spot, it is processed into focused beam data for each resolution cell in the scanned volume. The time delay between each projector spot and each hydrophone spot is determined for each resolution cell. The N values of data, corresponding to the N time delays, are extracted from the memory and, if necessary, rotated in phase to effect final focus corrections. Each of the N complex numbers are added to form the beam response at the focus point. The detector converts these complex values into magnitudes and performs any additional signal filtering that may be needed. The resulting image values are mapped into an image format for further use.

In the sonographic system 50, when the array scan is complete, the stored data is passed to an arithmetic unit 36 which computes the response at each point of interest in the target. The beamformed data is then in a desired format and stored in block 38. Image processing is appropriately performed by a block 40 to format the image data for any desired planar display of the target volume. The control 11 is provided with a suitably programmed procedure in which the described data processing logic is embedded. The procedure is executed to process the data as described.

In summary, a single projector element is paired with a single hydrophone element in random or other order to reduce data and processing load in a three-dimensional sonographic system. Further, the transducer elements may be rotated to face into the scanned volume as they are mechanically translated. This can increase scanned volume and reduce element count by applying the synthetic aperture "spotlight mode" to the disclosed orthogonal synthetic Mill's Cross configuration. The invention may be embodied in L-shaped or other orthogonal line arrays.

Overall, the invention employs synthetic paired element, orthogonal line scanning to produce high resolution, three dimensional ultrasound imaging with reduced data processing requirements and without signal reverberation ratio problems.

The foregoing description of the preferred embodiment has been presented to illustrate the invention. It is not intended to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

We claim:

1. An ultrasound sonographic system comprising:
   a synthetic scanner array having substantially orthogonal lines each having successive position spots with predetermined spacing therebetween;
   means for projecting acoustic signals into a target volume to be scanned;
   means for receiving reflected signals from within the target volume to be scanned;
   the projecting means and the receiving means being disposed at predetermined locations along the orthogonal scanner array lines;
   means for stepping the projecting means and receiving means from spot to spot along the array lines in a predetermined pattern of positions to enable a target volume scan to be performed;
   means for energizing the projecting means to transmit an acoustic signal into the target volume from each spot to which the projecting means is stepped;
   means for processing electric signals generated by the receiving means in response to reflected acoustic signals received at each spot to which the receiving means is stepped thereby to provide image data for the scanned target volume;

means for controlling the rate at which the stepping and energizing means are operated so that sufficient return data is generated to enable a target scan to be executed in a predetermined time period; and means for processing the image data for display.

2. The system of claim 1 wherein:

the orthogonal array is a Mill's Cross array;

the projecting means includes a projector;

the receiving means includes a hydrophone;

the projector and the hydrophone being respectively disposed on the respective array lines;

the stepping means stepping the projector and hydrophone as paired elements from spot to spot in unison;

the energizing means energizing the projectors to transmit an acoustic signal from respective projector spots in successive operating steps; and the processing means processing the electric signals generated by the hydrophone in each operating step.

3. The system of claim 2 wherein the orthogonal array is a Mill's Cross array, and starting and ending points for the projector and the hydrophone are end points of the line on which the projector or hydrophone is located.

4. The system of claim 2 wherein each position at which the projector transmits energy is uniquely associated with a hydrophone element position in its line array such that the order of hydrophone element positions may be systematic or random.

5. The system of claim 2 wherein multiple scans of the projector array are made and the hydrophone element position pattern is different for each scan with all hydrophone data being combined to form the final array response.

* * * * *